United States Patent [19]

Dietz

[11] 3,832,595

[45] Aug. 27, 1974

[54] HORIZONTAL DEFLECTION SYSTEM WITH BOOSTED B PLUS

[75] Inventor: Wolfgang Friedrich Wilhelm Dietz, New Hope, Pa.

[73] Assignee: RCA Corporation, New York, N.Y.

[22] Filed: Mar. 23, 1973

[21] Appl. No.: 344,296

[30] Foreign Application Priority Data

Apr. 5, 1972 Great Britain .................... 15576/72

[52] U.S. Cl. .......................... 315/27 TD, 178/7.5 R

[51] Int. Cl. ........................................... H01j 29/70

[58] Field of Search .................. 178/DIG. 11, 7.5 R; 315/27–29, 27 TD

[56] References Cited

UNITED STATES PATENTS

| | | | |
|---|---|---|---|
| 3,517,253 | 6/1970 | Dietz | 315/27 R |
| 3,626,238 | 12/1971 | Forster | 315/27 TD |
| 3,726,999 | 4/1973 | Dreiske | 178/DIG. 11 |
| 3,737,572 | 6/1973 | Frizane et al. | 178/DIG. 11 |

*Primary Examiner*—Malcolm F. Hubler
*Assistant Examiner*—J. M. Potenza
*Attorney, Agent, or Firm*—Eugene M. Whitacre; Paul J. Rasmussen

[57] ABSTRACT

A boosted B+ regulator in a horizontal deflection system adds a voltage derived from the deflection system to the line-rectified direct current voltage supplying the deflection system in such amount as to maintain a substantially constant boosted B+ supply voltage in the presence of variations of line voltage. Variations of the line-rectified voltage are sensed by a reference voltage network and added to a constant ramp voltage, the combination of voltages being applied to control the period of conduction of an active current conducting device which permits energy derived from the deflection system to be added to the line-rectified voltage supply for maintaining a regulated boosted supply voltage for the deflection system.

In one embodiment the energy derived from the deflection system is half-wave rectified by the active current conducting device. In a second embodiment the energy is full-wave rectified by the combination of the active current conducting device and an oppositely poled unidirectional current conducting device.

16 Claims, 10 Drawing Figures

HORIZONTAL DEFLECTION SYSTEM WITH BOOSTED B PLUS

BACKGROUND OF THE INVENTION

This invention relates to a boosted B+ voltage regulator for a deflection circuit of a television receiver.

It is desirable to regulate the operating supply voltage of the horizontal deflection circuit of a television receiver in order to supply constant energy to the horizontal deflection winding from one deflection cycle to another. Variations in the supply voltage change the amount of scanning current in the deflection winding and result in undesirable picture width variations. Additionally, it is customary to derive the ultor voltage for the picture tube from the horizontal deflection circuit by rectifying the flyback pulses produced in the horizontal output transformer during the retrace interval of each deflection interval. A variation of the supply voltage will vary the flyback pulse energy and hence the ultor voltage, resulting in picture brightness variation and a further variation in picture width. Furthermore, operating voltages for other portions of the receiver, such as the video or audio stages, may also be derived from the horizontal deflection circuit, and it is desirable that these voltages also be regulated. Of course, it is known that separate voltage regulators may be utilized for the deflection and other circuits, but such an approach is costly and increases the complexity of the receiver. Furthermore, in the interest of economy, it is desirable to rectify the alternating current line voltage directly without using a power transformer to step up the line voltage to supply a high enough level of operating voltage for the deflection circuit. The present invention is directed to a circuit which boosts and regulates the rectified alternating current voltage for application to a television receiver deflection circuit.

In accordance with one embodiment of the invention, a boosted B+ circuit for a deflection system includes a source of direct current voltage subject to undesirable voltage variations. Switching means in the deflection system operable during each deflection interval are coupled through an inductance means to the voltage source for receiving operating current therefrom. A winding of the inductance provides a source of alternating current as the switching means operates from one state to another during each deflection cycle. Active current conducting means are coupled to the winding and a terminal of the voltage source for rectifying the alternating current voltage and adding it to the direct current voltage. In an embodiment in which the boost voltage is regulated, control means are coupled to the active current conducting means for determining its period of conduction during each deflection cycle. Voltage sensing means are coupled to the control means and to a source of voltage representative of variations of the direct current voltage for providing a signal for the control means for determining the period of conduction of the active current conducting means and hence the amount of energy added to the direct current voltage source to keep it substantially constant.

A more detailed description of a preferred embodiment of the invention is given in the following description and accompanying drawing of which:

DESCRIPTION OF THE INVENTION

Figures 1, 2:
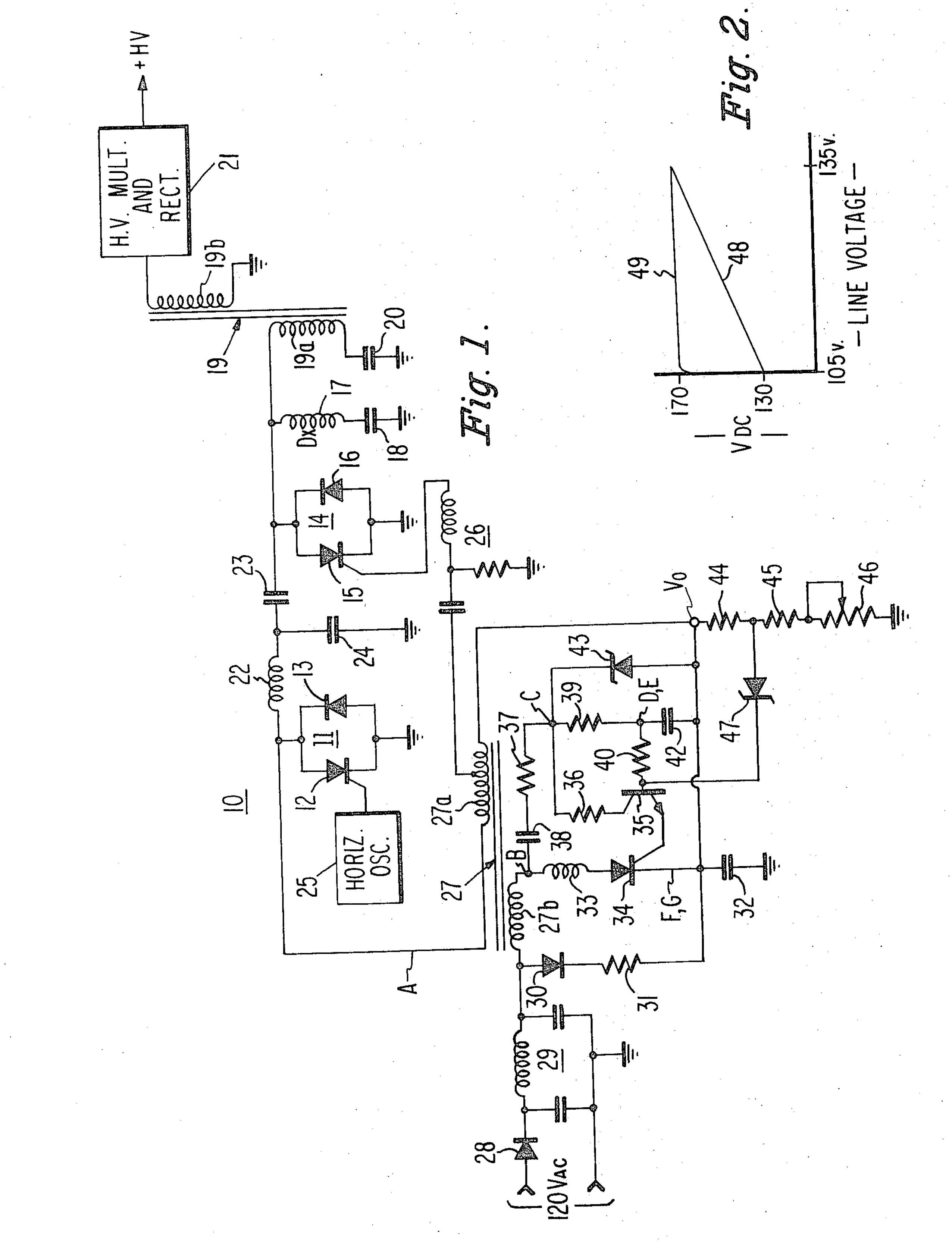
FIG. 1 is a schematic diagram, partially in block diagram form, of a deflection system embodying the invention.
FIG. 2 is a graph plotting the direct current voltage at two points in the circuit of FIG. 1 against line voltage.

FIG. 1 is a schematic diagram, partially in block form, of a deflection system 10 embodying the invention. With the exception of the regulator circuit, to be described subsequently, the horizontal deflection circuit is of the retrace driven type similar to that disclosed in U.S. Pat. No. 3,452,244. This circuit includes a commutating switch 11, comprising a silicon controlled rectifier (SCR) 12 and an oppositely poled damper diode 13 coupled between a winding **27*a* of an input choke 27 and ground. For purposes of explanation of the deflection circuit the other terminal of winding 27*a* may be considered to be connected to a source of positive direct current voltage. Commutating switch 11 is coupled through a commutating coil 22 and a capacitor 23 to a trace switch 14. Trace switch 14 comprises an SCR 15 and an oppositely poled damper diode 16. A capacitor 24 is coupled between the junction of coil 22 and capacitor 23 and ground. Trace switch 14 is coupled through the series combination of a horizontal deflection winding 17 and an S-shaping capacitor 18 to ground, and through a primary winding 19a of a horizontal output transformer 19 and a DC blocking capacitor 20** to ground.

A secondary, or high voltage, winding **19*b* of transformer 19 produces relatively large amplitude flyback pulses during the retrace interval of each deflection cycle. These pulses are applied to a high voltage multiplier and rectifier circuit 21** for producing a direct current high voltage in the order of 27 kilovolts for use as the ultor voltage of a television picture tube (not shown).

A horizontal oscillator 25 is coupled to the gate electrode of commutating SCR 12 and produces a pulse during each deflection cycle slightly before the end of the trace interval to turn on SCR 12 to initiate the commutating interval. A waveshaping network 26 is coupled betweeen a tap on the input choke winding **27*a* and the gate electrode of trace SCR 15 to form a signal to enable SCR 15** for conduction during the second half of the trace interval.

In the regulator portion of the deflection system, a source of alternating current line voltage is rectified by a rectifying diode 28 and filtered by a filtering network 29. The direct current voltage obtained from the filtering network 29 is coupled through a diode 30 and a current limiting resistor 31 to one terminal of a storage capacitor 32, the other terminal of which is grounded. The junction of resistor 31 and capacitor 32 is coupled to one terminal of winding **27*a* of input choke 27** for supplying the direct current operating potential to the deflection circuit.

A winding **27*b* of input inductance 27 has one terminal thereof coupled through an inductance 33 to the anode of a voltage regulating SCR 34. The cathode of SCR 34 is coupled to capacitor 32. The junction of winding 27*b* and inductance 33 is coupled through a capacitor 38, a resistor 37, a resistor 39 and a resistor 40 to the base electrode of a control transistor 35. The emitter electrode of transistor 35 is coupled to the gate electrode of SCR 34, and its collector electrode is coupled through resistor 36 to the junction of resistors 37 and 39. A clipping zener diode 43 has its cathode coupled to the junction of resistors 37 and 39 and its anode coupled to one terminal of capacitor 32. An integrating capacitor 42 is coupled between the junction of resistors 39 and 40 and capacitor 32**.

A voltage divider network comprising series coupled resistors 44 and 45 and potentiometer 46 is coupled across capacitor 32. A zener diode 47 has its anode coupled to the junction of resistors 44 and 45 and its cathode coupled to the base electrode of transistor 35.

At the beginning of the trace interval the deflection current of deflection winding 17 is at a maximum negative amplitude and is linearly decreasing as current is conducted through diode 16 and winding 17 to charge capacitor 18. About the middle of the trace interval the deflection current goes through zero and reverses; damper diode 16 is not cutoff and SCR 15, which had been enabled during the first half of trace by a positive gate pulse from waveshaping network 26, now conducts, providing a path to ground through winding 17 for energy stored in capacitor 18, which capacitor 18 also serves as an S-shaping capacitor. It should be noted that the average voltage across capacitor 18 is in the order of 50 volts and the capacitor is large enough such that during each deflection cycle it charges and discharges only partly about the nominal 50 volts average charge.

During the trace interval commutating switch 11 is open, and capacitors 23 and 24 are charged in parallel through commutating coil 22 by the energy stored in winding 27a of input choke 27. Slightly before the end of trace a positive gate from horizontal oscillator 25 enables SCR 12 and it starts to conduct, initiating the commutating interval. At this time first and second resonant circuits are formed; the first comprising SCR 12, coil 22 and capacitor 24, and the second comprising SCR 12, coil 22, capacitor 23 and SCR 15 which now conducts a current in two directions.

The resonant current through SCR 15 from capacitor 23 increases more rapidly than the increasing deflection current and when the former exceeds the latter SCR 15 is turned off. At this time the current switches to diode 16, but when the resonant current from capacitor 23 reverses, diode 16 is switched off, disconnecting the deflection current path, ending the trace interval and initiating the retrace interval. During the retrace interval, which is totally included within the commutating interval, energy is supplied through switch 11, coil 22 and capacitors 23 and 24 through the deflection winding 17 to replenish the charge on capacitor 18 and from switch 11, coil 22 and capacitors 23 and 24 to replenish the energy in the primary winding 19a of horizontal output transformer 19.

During the energy exchange retrace interval SCR 12 and diode 13 are rendered nonconducting as the resonating voltage in turn reverse biases each device, opening switch 11. Also, as the resonating current decreases the reverse bias across diode 16, it again conducts, initiating the next trace interval.

The commutating interval ends shortly after the beginning of the trace interval as the currents in capacitors 23 and 24 approach zero and diode 13, which had been conducting for a second time during the commutating interval, is cutoff. During the commutating interval when switch 11 was closed winding **27*a* was placed between the source of operating potential and ground and hence conducted a linearly increasing current. At the end of the commutating interval, when switch 11 opens, the energy stored in winding 27*a* again charges capacitors 23 and 24** in preparation for the next commutating interval.

From the above description of operation of the deflection circuit it should be understood that any variation in the direct current operating potential coupled through winding **27*a* to the commutating portion of the circuit will vary the amount of energy restored to the primary winding 19*a* and capacitor 18** and hence cause undesirable variations in ultor voltage and picture width.

FIG. 2 is a graph plotting the relationship of alternating curren line voltage (abscissa) to the direct current operating potential (ordinate) produced by the power supply and regulator portion of the deflection system of FIG. 1. The curve 48 illustrates the DC output potential of rectifier 28 and filtering network 29 as a function of line voltage. As the line voltage varies from 105 to 135 volts the DC voltage varies from about 130 to 170 volts. As these line voltage variations about a nominal 120 volts may occur frequently, it is obvious that some regulation scheme is essential. Furthermore, it is desirable to operate the deflection circuit at a constant DC voltage of about 170 volts as illustrated by curve 49 of FIG. 2, which is above the potential available from the rectified line voltage except at extremely high line voltage. The function of the regulator portion of the deflection system of FIG. 1 is to boost the line-rectified voltage and to regulate it at the boosted point as the line voltage varies. To accomplish this the boost-regulator circuit adds to the rectified line voltage the voltage represented by the difference between the curves 48 and 49.

FIGS. 3A-3G illustrate normalized voltage and current waveforms obtained at various points of the circuit of FIG. 1 and will be referred to in the subsequent discussion of the regulator portion of the circuit. The time base and relative amplitudes of the waveforms are not drawn to scale to simplify the drawing. For convenience, the points of the circuit of FIG. 1 at which the waveforms of FIGS. 3A-3G are obtained are lettered A-G in the circuit.

Figures 3A, 3B, 3C, 3D, 3E, 3F, 3G, 4:
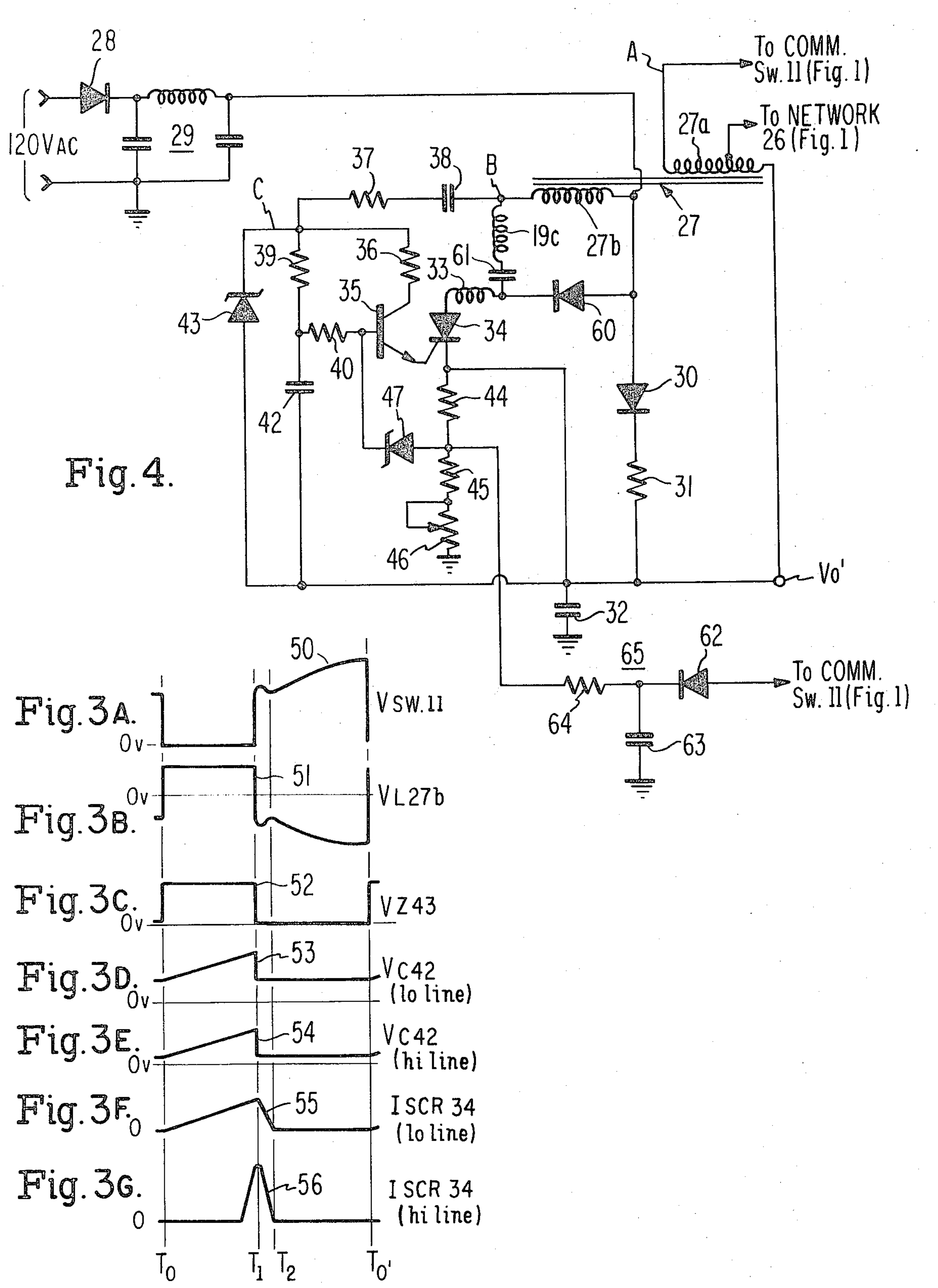
FIGS. 3A-3G are normalized waveforms obtained at various points in the diagram of FIG. 1.
FIG. 4 is a schematic diagram of another embodiment of a regulator circuit according to the invention.

During initial operation of the circuit, occurring when the television receiver is switched on, the line-rectified voltage is coupled through diode 30 and current limiting resistor 31 to input choke winding **27*a* to initiate operation of the deflection circuit as described above. As the deflection circuit operates a voltage waveform 50 of FIG. 3A is developed across the commutating switch 11. The commutating interval is represented by the 0 volt portion of waveform 50. This waveform is coupled by transformer action to winding 27*b* of input choke 27 and appears inverted as waveform 51 of FIG. 3B with reference to ground at the junction of winding 27*b*, capacitor 38 and inductance 33. In the embodiment of FIG. 1 it is the positive portion, or commutating interval portion, of waveform 51 which is rectified by SCR 34 to be added to the line-rectified voltage appearing across capacitor 32**. In this arrangement energy is taken from the deflection circuit only during the commutating interval and hence has very little effect on the operation of the deflection circuit during the trace interval.

Waveform 51 is also coupled through capacitor 38 and resistor 37 to the cathode of zener diode 43, the anode of which is returned to the $V_0$ supply. Zener diode 43 is selected to clip the positive portion of waveform 51 such that there is always a peak to peak voltage across it regardless of variations in the peak positive level of waveform 51. The fixed clipped waveform across zener diode 43 is illustrated by voltage waveform 52 of FIG. 3C. The waveform 52 is coupled through a resistor 36 to supply the collector electrode operating potential for control transistor 35. Waveform 52 is integrated by resistor 39 and capacitor 42 to form a constant peak to peak voltage sawtooth which is then coupled through a resistor 40 to bias the base electrode of transistor 35.

The voltage divider comprising series resistors 44, 45 and potentiometer 46 senses any variations in the $V_0$ supply voltage. Zener diode 47 coupled between the base of transistor 35 and the junction of resistors 44 and 45 provides a variable conduction path altering the base drive current supplied to transistor 35 and hence the time that SCR 34 is turned on during each deflection cycle.

For a condition of low line voltage the $V_0$ direct current voltage also tends to decrease to a less positive level. This results in less of a voltage drop across resistor 44. With less of a positive voltage at the anode of zener diode 47 the voltage at its cathode can rise a corresponding amount before the zener diode 43 conducts. Thus, the sawtooth voltage from capacitor 42 supplies only the base circuit of transistor 35 and all of the current from capacitor 42 drives the base of the current amplifier 35. The voltage at the emitter electrode of transistor 35 then in turn gates on SCR 34 at time $T_0$ (the beginning of the commutation interval as indicated by the timing lines common to all of FIGS. 3A-3G) and enables SCR 34 to conduct until $T_2$, occurring shortly after the end of the commutation interval. In this manner storage capacitor 32 is charged with a maximum amount of energy and hence increases the $V_0$ potential. The sawtooth voltage waveform applied to the base electrode of transistor 35 during the low line voltage conditions is illustrated by waveform 53 of FIG. 3D. The current waveform of the main conduction path of SCR 34 during this condition is illustrated by waveform 55 of FIG. 3F.

Conversely, during a condition of high line voltage, the $V_0$ supply voltage tends to become more positive and there is an increased voltage drop across the voltage divider and resistor 44. This raises the cathode and anode potential of zener diode 47. Zener diode 47 then starts to conduct earlier in time along the time base of the sawtooth voltage across capacitor 42 and thereby provides a bleed path, through resistor 45 and potentiometer 46, for current from capacitor 42 which would otherwise supply the base electrode of transistor 35. The sawtooth voltage must then rise to a more positive level before transistor 35, and consequently, SCR 34, conduct. This shortens the period within the commutating interval during which energy is added to capacitor 32 and hence lowers the $V_0$ voltage.

Resistor 45 and potentiometer 46 are in the discharge path for capacitor 42 once zener diode 47 conducts and hence determine the rate of removal of the sawtooth bias for transistor 35. Potentiometer 46 is adjusted to set the voltage at which regulation starts.

Under the condition of extremely high line voltage when SCR 34 is not turned on at all, the deflection system operating current will be conducted through diode 30. In this situation current limiting resistor 31 prevents a large increase in voltage as the current is switched from SCR 34 to diode 30.

Inductance 33 in series with SCR 34 is selected to control the rate of current rise and hence shuts off SCR 34 at $T_2$ after the end of the commutation interval. The size of inductance 33 may be selected to control the maximum amount of energy passed by SCR 34 and stored in capacitor 32. Energy from inductance 33 and the leakage inductance of choke 27 passed on to capacitor 32 can be seen as the positive excursion of waveform 50 of FIG. 3A during the interval $T_1$ - $T_2$.

Since the $V_0$ is regulated as it is applied to input choke 27, auxiliary power supply circuits coupled to auxiliary windings of the choke 27, or to windings of the horizontal output transformer 19, such as a rectifying circuit for supplying operating voltage to the television receiver video circuits or a supply for energizing the filaments of the picture tube, will also be regulated.

FIG. 4 is a schematic diagram of another embodiment of a boosted B+ regulator for a deflection system according to the invention. Those circuit elements in FIG. 4 which perform similar functions to the correspondingly numbered elements in FIG. 1 have the same reference numerals as in FIG. 1. For convenience, the actual deflection circuit has been omitted from FIG. 4. However, it is to be understood that a deflection circuit similar to that shown in FIG. 1 may be utilized with the embodiment shown in FIG. 4. The boosted B+ regulator circuit of FIG. 1 utilized an SCR 34 as a half-wave rectifier for an alternating current wave derived from the input choke 27. In addition to the regulation aspect the FIG. 1 circuit provided a B boost such that the operating potential $V_0$ supplied to the deflection circuit was in the order of 170 volts. In the FIG. 4 embodiment a full-wave rectifier arrangement is utilized to provide an even greater regulated potential, the boosted operating potential being in the order of 200 volts. Generally, with the exception of the full-wave rectifier circuit portion, the operation of the regulator circuit is similar to that of FIG. 1.

In FIG. 4 a source of alternating current line voltage is rectified by a rectifying diode 28 and filtered by a filtering network 29. During initial operation of the receiver and under extremely high line voltage conditions the operating potential for the deflection circuit is supplied through the series arrangement of a diode 30, a current limiting resistor 31, and through a winding **27*a* of the input choke 27 to the commutating switch 11** of FIG. 1.

During a low line voltage condition the operating potential $V_0'$ tends to decrease. During the commutation interval of each deflection cycle the positive portion of waveform 51 is coupled through a winding **19*c* of the horizontal output transformer of FIG. 1, inductance 33 and rectified by SCR 34. The current through SCR 34 charges capacitor 32. This produces a higher voltage across the storage capacitor 32 which is coupled through winding 27*a*** to supply the deflection circuit.

Similar to the arrangement of FIG. 1, during a low line voltage condition less voltage appears across the voltage divider network comprising resistors 44, 45 and potentiometer 46 and hence there is less voltage developed across resistor 44. This lowers the positive potential appearing at the anode of zener diode 47 and hence allows the base electrode potential of transistor 35 to rise to a higher voltage before zener diode 47 conducts. This allows transistor 35 to conduct during the entire commutation interval as the integrated sawtooth wave is coupled to the base electrode of transistor 35. Thus, transistor 35 gates on SCR 34 at the start of the commutation interval and SCR 34 passes current to charge capacitor 32 during the entire commutation interval, and slightly beyond the time $T_2$, thereby providing a maximum voltage boost to the line rectified voltage.

In this embodiment a winding 19*c* of the horizontal output transformer of FIG. 1 has been added in series with the winding 27*b* of the input choke. Although the circuit may be operated without the addition of winding 19*c* the inclusion of this winding provides a flyback pulse which occurs within the commutation interval, the energy of which is simply added to the energy of the commutation pulse which is passed by SCR 34. This arrangement increases the energy which may be stored in capacitor 32 during the commutation interval.

Diode 60, having its cathode coupled to capacitor 61 and inductance 33 and its anode coupled to winding 27*b*, is oppositely poled to SCR 34 and enables rectification of the waveform 51 during the trace interval to further add to the boosted potential $V_0'$. During the trace interval when the trace portion of waveform 51 is negative, current is conducted by diode 60 and is stored in capacitor 61. This arrangement is analogous to the operation of a voltage doubler circuit, in which capacitor 61 is discharged during the next commutation interval, thereby adding its charge, which is essentially a control for each cycle, to the charge on capacitor 32. This charge is added during the condition of high line voltage as well as the condition of low line voltage as long as SCR 34 conducts.

Under conditions of high line voltage the voltage drops across the voltage divider and hence resistor 44 is greater, putting high positive potential at the anode of zener diode 47. Thus, as in the FIG. 1 embodiment, zener diode 47 will conduct earlier in time during the period of the sawtooth voltage ramp applied to the base electrode of transistor 35. As zener diode 47 conducts it bleeds the base drive current from transistor 35 which then does not conduct until a later time in the period of the sawtooth ramp. Hence, SCR 34 is gated on for only a small portion, if any, of the commutation interval and less current is passed by it to charge capacitor 32 thereby tending to lower the output voltage $V_0'$. As mentioned above, diode 60 will still conduct during the trace portion of waveform 51, the regulation of the voltage being accomplished by SCR 34 and its associated control circuit.

In FIG. 4, a network 65 provides sensing of the commutation switch 11 waveform 50 of FIG. 3A to add a beam current regulation function to the circuit. The waveform 50 obtained from the anode of SCR 12 of switch 11 of FIG. 1 is rectified by a diode 62, filtered by a capacitor 63 and coupled through a resistor 64 to the junction of resistors 44 and 45 in the voltage divider. A higher beam current will result in a lower peak voltage of waveform 50 and hence lower the potential at the junction of resistors 44 and 45, thereby causing the regulator circuit to compensate and increase the amount of boost voltage as described above. As the sensing voltages for line voltage variations and beam current variations are in opposition to each other, the values of resistors 44 and 64 are selected to proportion the types of regulation. The beam regulation circuit may be used as well with the half-wave regulator circuit described in conjunction with FIG. 1.

What is claimed is:

1. In a deflection system for supplying energy to a deflection winding during a portion of each deflection interval, a voltage boost circuit comprising:

a source of direct current voltage subject to undesirable voltage variations;

switching means in said deflection system operable from a first to a second state during each deflection interval;

inductance means coupled to said source of direct current voltage and to said switching means for supplying operating current to said deflection system during a portion of each deflection interval; and rectifying means including active current conducting means coupled to said inductance means, across which inductance means is developed an alternating current voltage in response to said switching means operating from said first to said second state, and to said source of direct current voltage for rectifying said alternating current voltage and adding it to the voltage produced by said source of direct voltage.

2. A voltage boost circuit according to claim 1 further including control means coupled to said active current conducting means for controlling the period of conduction thereof; and voltage sensing means coupled to said control means and to said source of direct current voltage for developing a signal respresentative of voltage variations of said source of direct current, said control means being responsive to said signal for determining the period of conduction of said active current conducting means for determining the amount of energy added to said source of direct current voltage for maintaining the voltage from said source substantially constant.

3. A voltage boost circuit according to claim 2 wherein said active current conducting means is a silicon controlled rectifier and said control means includes a transistor, an output electrode of said transistor being coupled to the gate electrode of said SCR.

4. A voltage boost circuit according to claim 3 wherein said control means includes means coupled to said inductance for supplying a constant ramp voltage to the control electrode of said control transistor for biasing said electrode.

5. A voltage boost circuit according to claim 4 wherein said voltage sensing means includes a voltage divider coupled between said direct current voltage source and a point of reference potential, and a zener diode having one terminal coupled to the control electrode of said control transistor and the other terminal coupled to a point on said voltage divider whereby the voltage at said point determines the time at which said zener diode conducts during the period of said ramp voltage and thereby determines the conduction time of said transistor and said SCR during each deflection cycle for determining the amount of boost voltage added to the voltage of said direct current supply source.

6. A voltage boost circuit according to claim 5 wherein said rectifying means includes a first capacitor coupled to the main current conducting path of said SCR and to said source of direct current voltage for receiving charge from said SCR for boosting said direct current voltage.

7. A voltage boost circuit according to claim 6 wherein said rectifying means includes a diode coupled to said inductance means and oppositely poled from the main current conducting path of said SCR for rectifying the opposite polarity portion of said alternating current voltage waveform than is rectified by said SCR, and a second capacitor coupled to said diode and to the junction of said SCR and said inductance means for receiving charge from said diode for further boosting said direct current voltage.

8. In a television deflection system in which a first switching means couples a deflection winding across a source of energy during a trace interval of each deflection cycle and a seocnd switching means replenishes energy to said source of energy during a commutation interval of each deflection cycle, a voltage regulator circuit comprising:

a source of direct current voltage subject to undesirable voltage variations;

means including an inductance coupled to said source of direct current voltage and to said first switching means for supplying operating current to said first switching means;

a winding magnetically coupled to said inductance, having a first terminal coupled to said source of direct current voltage, said winding having developed across it an alternating current voltage as said first switching means operates from one state to another during the commutation and trace intervals of each deflection cycle;

energy storage means coupled to said source of direct current voltage;

an active current conducting device having its main current conduction path coupled between a second terminal of said winding and said energy storage means and poled to conduct current during the commutation interval of each deflection cycle for rectifying a portion of said alternating current waveform developed across said winding, thereby adding energy to said energy storage means and boosting said direct current voltage;

control means coupled to a control electrode of said active current conducting device for determining the period of conduction of said device during each commutation interval; and voltage sensing means coupled to said energy storage means and to said control means for developing signals respresentative of variations of said direct current voltage, said control means being responsive to said signals for determining the period of conduction of said active current conducting device for controlling the amount of energy added to said energy storage means for maintaining said direct current voltage substantially constant.

9. A voltage regulator according to claim 8 wherein said control means includes a transistor, an output electrode of which is coupled to the gate electrode of said active current conducting device and further includes means coupled to said inductance for supplying a constant ramp voltage to the control electrode of said transistor for biasing said electrode.

10. A voltage regulator according to claim 9 wherein said voltage sensing means includes a voltage divider coupled between said direct current voltage source and a point of refrence potential, and a zener diode having one terminal coupled to the control electrode of said control transistor and the other terminal coupled to a point on said voltage divider whereby the voltage at said point determines the time at which said zener diode conducts during the period of said ramp voltage and thereby determines the conduction time of said transistor and said active current conducting device during each deflection cycle for determining the amount of boost voltage added to the voltage of said direct current supply source.

11. A voltage regulator according to claim 10 wherein an inductance is serially coupled between said second terminal of said winding and said active current conducting means for limiting the charging current passed by said active current conducting device to said energy storage means.

12. A voltage regulator according to claim 11 wherein said inductance means includes a winding of the horizontal output transformer of said deflection system for adding flyback pulse energy to said deflection system energy which is rectified by said active current conducting device.

13. In a television deflection system in which a first switching means couples a deflection winding across a source of energy during a trace interval of each deflection cycle and a second switching means replenishes energy to said source of energy during a commutation interval of each deflection cycle, a voltage regulator circuit comprising:

a source of direct current voltage subject to undesirable voltage variations;

means including an inductance coupled to said source of direct current voltage and to said first switching means for supplying operating current to said first switching means;

a winding magnetically coupled to said inductance, having a first terminal coupled to said source of direct current voltage, said winding having developed across it an alternating current voltage as said first switching means operates from one state to another during the commutation and trace intervals of each deflection cycle;

first and second energy storage means coupled to said source of direct current voltage;

rectifying means including an active current conducting device having its main current conduction path coupled between a second terminal of said winding and said first energy storage means and poled to conduct current during the commutation interval of each deflection cycle for rectifying a portion of said alternating current waveform developed across said winding, thereby adding energy to said first energy storage means and boosting said direct current voltage, and a unidirectional current conducting means having one terminal coupled to said second terminal of said winding and poled to conduct current in the opposite direction than said active current conducting means and having its other terminal coupled to said second energy storage means for rectifying the trace interval portion of said alternating current waveform and adding energy to said second energy storage means for further boosting said direct current voltage;

control means coupled to a control electrode of said active current conducting device for determining the period of conduction of said device during each commutation interval; and voltage sensing means coupled to said energy storage means and to said control means for developing signals respresentative of variations of said direct current voltage, said control means being responsive to said signals for determining the period of conduction of said active current conducting device for controlling the amount of energy added to said energy storage means for maintaining said direct current voltage substantially constant.

14. A voltage regulator according to claim 13 wherein said control means includes a transistor, an output electrode of which is coupled to the gate electrode of said active current conducting device and further includes means coupled to said inductance for supplying a constant ramp voltage to the control electrode of said transistor for biasing said electrode.

15. A voltage regulator according to claim 14 wherein said voltage sensing means includes a voltage divider coupled between said direct current voltage source and a point of reference potential, and a zener diode having one terminal coupled to the control electrode of said control transistor and the other terminal coupled to a point on said voltage divider whereby the voltage at said point determines the time at which said zener diode conducts during the period of said ramp voltage and thereby determines the conduction time of said transistor and said active current conducting device during each deflection cycle for determining the amount of boost voltage added to the voltage of said direct current supply source.

16. A voltage regulator according to claim 15 wherein an inductance is serially coupled between said first terminal of said winding and said active current conducting means for limiting the charging current passed by said active current means to said second energy storage means.

* * * * *

UNITED STATES PATENT OFFICE
CERTIFICATE OF CORRECTION

PATENT NO. : 3,832,595

DATED : August 27, 1974

INVENTOR(S) : Wolfgang Friedrich Wilhelm Dietz

It is certified that error appears in the above-identified patent and that said Letters Patent are hereby corrected as shown below:

Column 3, line 17, that portion reading "of" should read --in --. Column 6, line 18, after "$V_o$" insert -- supply --. Column 7, line 13, that portion reading "the" should read -- to --; line 42, that portion reading "high" should read -- higher --.

Signed and Sealed this

*second* Day of *September 1975*

[SEAL]

*Attest:*

RUTH C. MASON
*Attesting Officer*

C. MARSHALL DANN
*Commissioner of Patents and Trademarks*